United States Patent
Dolezilek et al.

(10) Patent No.: US 9,270,109 B2
(45) Date of Patent: Feb. 23, 2016

(54) EXCHANGE OF MESSAGES BETWEEN DEVICES IN AN ELECTRICAL POWER SYSTEM

(71) Applicant: Schweitzer Engineering Laboratories, Inc., Pullman, WA (US)

(72) Inventors: David J. Dolezilek, Pullman, WA (US);
Benjamin S. Day, Pullman, WA (US);
Dennis Gammel, Pullman, WA (US);
Ryan Bradetich, Pullman, WA (US);
Jerry J Bennett, Pullman, WA (US);
Christopher Ewing, Colfax, WA (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 119 days.

(21) Appl. No.: 13/841,409

(22) Filed: Mar. 15, 2013

(65) Prior Publication Data
US 2014/0280712 A1 Sep. 18, 2014

(51) Int. Cl.
*G06F 15/16* (2006.01)
*H04L 1/18* (2006.01)
*H02H 7/26* (2006.01)
*H04L 1/08* (2006.01)

(52) U.S. Cl.
CPC ............ *H02H 7/261* (2013.01); *H04L 1/08* (2013.01); *H04L 1/189* (2013.01)

(58) Field of Classification Search
CPC ........... H04L 1/08; H04L 1/18–1/1896; H04L 47/00–47/127
USPC ............................ 709/230–235; 714/748–749
See application file for complete search history.

(56) References Cited

U.S. PATENT DOCUMENTS

| 4,054,949 A | * | 10/1977 | Takezoe ..................... 709/234 |
| 4,535,306 A | | 8/1985 | Yamaguchi |
| 4,546,486 A | | 10/1985 | Evans |

(Continued)

FOREIGN PATENT DOCUMENTS

| GB | 2278519 | 11/1994 |
| WO | 0057527 | 9/2000 |

(Continued)

OTHER PUBLICATIONS

Fateri, Sina, et al. "Design and Analysis of Multicast-Based Publisher/Subscriber Models over Wireless Platforms for Smart Grid Communications." Trust, Security and Privacy in Computing and Communications (TrustCom), 2012 IEEE 11th International Conference on. IEEE, 2012.*

(Continued)

*Primary Examiner* — David Lazaro
*Assistant Examiner* — Julian Chang
(74) *Attorney, Agent, or Firm* — John P. Davis

(57) ABSTRACT

Systems and methods are presented for exchanging messages between devices in an electrical power generation and delivery system. In certain embodiments, a method for exchanging messages between devices may include transmitting messages included in a message stream that includes multiple redundant copies of the messages. An indication may be received that at least one message of the message stream was received by an intended receiving device. Transmission of further redundant copies of the message included in the message stream may be determined based on receipt of the indication.

15 Claims, 9 Drawing Sheets

(56) References Cited

U.S. PATENT DOCUMENTS

| | | | |
|---|---|---|---|
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,596,263 A | 1/1997 | Zavis | |
| 5,630,757 A * | 5/1997 | Gagin et al. | 463/43 |
| 5,699,367 A * | 12/1997 | Haartsen | 714/749 |
| 5,793,869 A | 8/1998 | Claflin | |
| 6,456,831 B1 | 9/2002 | Tada | |
| 6,535,925 B1 | 3/2003 | Svanbro | |
| 6,577,628 B1 | 6/2003 | Hejza | |
| 6,608,841 B1 | 8/2003 | Koodli | |
| 6,678,134 B2 | 1/2004 | Sugiura | |
| 6,751,209 B1 | 6/2004 | Hamiti | |
| 6,754,210 B1 | 6/2004 | Ofek | |
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 6,973,085 B1 | 12/2005 | Acharya | |
| 7,239,581 B2 | 7/2007 | Delgado | |
| 7,272,201 B2 | 9/2007 | Whitehead | |
| 7,283,568 B2 | 10/2007 | Robie | |
| 7,463,467 B2 | 12/2008 | Lee | |
| 7,571,216 B1 | 8/2009 | McRae | |
| 7,617,408 B2 | 11/2009 | Frazier | |
| 7,664,869 B2 | 2/2010 | Baker | |
| 7,701,683 B2 | 4/2010 | Morris | |
| 8,082,367 B2 | 12/2011 | Etheridge | |
| 8,351,433 B2 | 1/2013 | Morris | |
| 8,578,012 B2 | 11/2013 | Bradetich | |
| 8,793,767 B2 | 7/2014 | Schweitzer | |
| 8,819,512 B1 * | 8/2014 | Wang et al. | 714/748 |
| 9,065,763 B2 | 6/2015 | Kasztenny | |
| 2001/0023464 A1 | 9/2001 | Deck | |
| 2002/0069299 A1 | 6/2002 | Rosener | |
| 2002/0080808 A1 | 6/2002 | Leung | |
| 2003/0195975 A1 | 10/2003 | Papadopoulos | |
| 2003/0204756 A1 | 10/2003 | Ransom | |
| 2004/0138786 A1 | 7/2004 | Blackett | |
| 2004/0138834 A1 | 7/2004 | Blackett | |
| 2004/0148552 A1 * | 7/2004 | Matsumoto et al. | 714/712 |
| 2004/0196855 A1 | 10/2004 | Davies | |
| 2004/0213214 A1 * | 10/2004 | Jung et al. | 370/352 |
| 2005/0025105 A1 | 2/2005 | Rue | |
| 2005/0085279 A1 * | 4/2005 | Aoki | 455/574 |
| 2005/0160184 A1 | 7/2005 | Walsh | |
| 2006/0029105 A1 | 2/2006 | Kasztenny | |
| 2006/0123119 A1 * | 6/2006 | Hill et al. | 709/227 |
| 2007/0002746 A1 | 1/2007 | Shankar | |
| 2007/0058320 A1 | 3/2007 | Lee | |
| 2007/0096942 A1 | 5/2007 | Kagan | |
| 2007/0127487 A1 | 6/2007 | Kim | |
| 2007/0147415 A1 | 6/2007 | Marusca | |
| 2007/0252724 A1 | 11/2007 | Donaghey | |
| 2007/0291780 A1 | 12/2007 | Smith | |
| 2008/0005484 A1 | 1/2008 | Joshi | |
| 2008/0068291 A1 | 3/2008 | Yuan | |
| 2008/0071482 A1 | 3/2008 | Zweigle | |
| 2008/0101251 A1 | 5/2008 | Casebolt | |
| 2008/0127210 A1 | 5/2008 | Bosold | |
| 2008/0188264 A1 * | 8/2008 | Duan | 455/561 |
| 2008/0189784 A1 | 8/2008 | Mangione-Smith | |
| 2008/0192635 A1 * | 8/2008 | Usuda et al. | 370/235 |
| 2008/0219186 A1 | 9/2008 | Bell | |
| 2008/0235355 A1 | 9/2008 | Spanier | |
| 2009/0052392 A1 * | 2/2009 | Sumasu et al. | 370/331 |
| 2009/0141727 A1 | 6/2009 | Brown | |
| 2009/0160189 A1 | 6/2009 | Rasmussen | |
| 2009/0180477 A1 | 7/2009 | Akahane | |
| 2009/0254655 A1 | 10/2009 | Kidwell | |
| 2009/0260083 A1 | 10/2009 | Szeto | |
| 2009/0300165 A1 * | 12/2009 | Tuckey et al. | 709/224 |
| 2009/0319904 A1 | 12/2009 | Rensin | |
| 2010/0020773 A1 * | 1/2010 | Jechoux | 370/338 |
| 2010/0054164 A1 * | 3/2010 | Lucani et al. | 370/294 |
| 2010/0104044 A1 * | 4/2010 | Kishigami et al. | 375/299 |
| 2010/0142560 A1 | 6/2010 | Sharivker | |
| 2010/0182952 A1 * | 7/2010 | Jeong et al. | 370/328 |
| 2010/0195763 A1 | 8/2010 | Lee | |
| 2010/0215004 A1 * | 8/2010 | Yoo | 370/329 |
| 2010/0251134 A1 | 9/2010 | Van Seggelen | |
| 2010/0275086 A1 * | 10/2010 | Bergquist et al. | 714/748 |
| 2011/0022666 A1 | 1/2011 | Pinto | |
| 2011/0069709 A1 * | 3/2011 | Morris et al. | 370/394 |
| 2011/0069718 A1 | 3/2011 | Morris | |
| 2012/0005326 A1 | 1/2012 | Bradetich | |
| 2012/0078555 A1 | 3/2012 | Banhegyesi | |
| 2012/0082048 A1 | 4/2012 | Taft | |
| 2012/0155458 A1 * | 6/2012 | Larson et al. | 370/389 |
| 2012/0195309 A1 * | 8/2012 | Okuda | 370/389 |
| 2012/0215479 A1 | 8/2012 | Pamulaparthy | |
| 2012/0278421 A1 | 11/2012 | Sun | |
| 2013/0018521 A1 | 1/2013 | Manson | |
| 2013/0039266 A1 * | 2/2013 | Ekici et al. | 370/328 |
| 2013/0091258 A1 | 4/2013 | Shaffer | |
| 2013/0117755 A1 | 5/2013 | Bontempi | |
| 2013/0142336 A1 * | 6/2013 | Fries et al. | 380/278 |
| 2014/0025321 A1 * | 1/2014 | Spanier | 702/62 |
| 2014/0195844 A1 | 7/2014 | Laval | |
| 2014/0269736 A1 * | 9/2014 | Kasztenny et al. | 370/400 |

FOREIGN PATENT DOCUMENTS

| | | |
|---|---|---|
| WO | 0016525 | 3/2001 |
| WO | 2005088911 | 9/2005 |

OTHER PUBLICATIONS

Maheswaran, O., A. Kavitha Lakshmi, and R. Malarvizhi. "Guidelines for specification and evaluation of substation automation projects based on IEC 61850." CIGRE India Journal 1.1 (2012): 30-35.*

Brantley, Robert, Jacobus Theron, and Eric Udren. "The Application of IEC® 61850 to Replace Auxiliary Devices Including Lockout Relays." 60th Annual Georgia Tech Protective Relaying Conference May. 2006.*

Xyngi, I., and M. Popov. "IEC61850 overview-where protection meets communication." (2010): 46-46.*

Smith, T., J. Vico, and Craig Wester. "Advanced distribution reclosing using wireless communications." Rural Electric Power Conference (REPC), 2011 IEEE. IEEE, 2011.*

Ozansoy, Cagil R., Aladin Zayegh, and Akhtar Kalam. "The real-time publisher/subscriber communication model for distributed substation systems."Power Delivery, IEEE Transactions on 22.3 (2007): 1411-1423.*

PCT/US2014/023169 Patent Cooperation Treaty, International Search Report and Written Opinion of the International Searching Authority, Aug. 19, 2014.

PCT/US2014/016955 Patent Cooperation Treaty, International Search Report and Written Opinion of the International Searching Authority, Jun. 5, 2014.

Roy Moxley, Ken Fodero, and Hector J. Altuve, Updated Transmission Line Protection Communications, IEEE, Oct. 2008.

James W. Rice, Sam Fulford, and Nicholas C. Seeley, Improved Service Reliability for Rural Electric Customers-Innovative Auto-Restoration Following Loss of Primary Source Interconnection, Sep. 2006.

Nicholas C. Seeley, Automation at Protection Speeds: IEC 61850 GOOSE Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

PCT/US2010/049169 Patent Cooperation Treaty Notification of Transmittal of the International Search Report and the Written Opinion, International Search Report, and Written Opinion, Nov. 5, 2010.

(56) References Cited

OTHER PUBLICATIONS

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

Daqing Hou, Dave Dolezilek, IEC 61850—What It Can and Cannot Offer to Traditional Protection Schemes, Sep. 2008.

PCT/US2011/039498 Patent Cooperation Treaty, International Search Report and Written Opinion of the International Searching Authority, Oct. 21, 2011.

W. Kleinebreg, ABB Switzerland Ltd., Hirschmann Automation & Control GmbH, IEC 61850 Modeling of Switches, Dec. 2009.

Bill Lichtensteiger, Branko Bjelajac, Christian Muller, Christian Wietfeld. "RF Mesh Systems for Smart Metering: System Architecture and Performance", Smart Grid Communications, IEEE, Oct. 2010.

\* cited by examiner

EXCHANGE OF MESSAGES BETWEEN DEVICES IN AN ELECTRICAL POWER SYSTEM

TECHNICAL FIELD

This disclosure relates to systems and methods for managing communication between devices of an electric power generation and delivery system, and more particularly, to systems and methods for exchanging messages between network devices and intelligent electronic devices of the electric power generation and delivery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
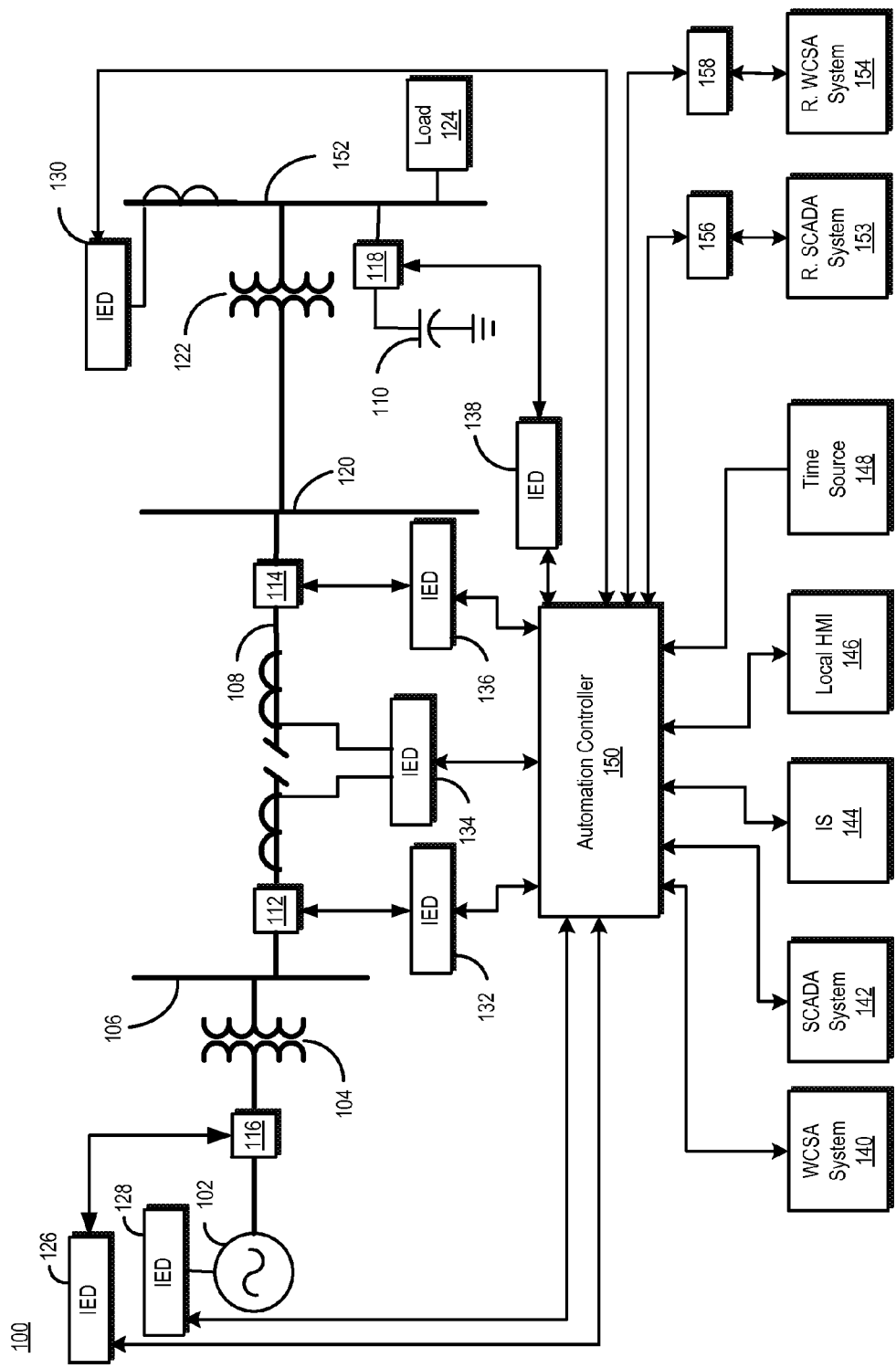
FIG. 1 illustrates a simplified diagram of an example of an electric power generation and delivery system consistent with certain embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

IEDs may communicate with other IEDs, monitored equipment, and/or network devices using one or more suitable communication protocols and/or standards. In certain embodiments one or more IED devices included in an electric power generation and delivery system may communicate using a variety of protocols, such as IEC 61850 GOOSE (Generic Object Oriented Substation Events), SV (Sampled Values), MMS (Manufacturing Messaging Specification), SEL Fast Message (FM), and/or Mirrored Bits®. GOOSE may be utilized to facilitate communication between IEDs and GOOSE-enabled pieces of monitored equipment and/or network devices. For example, IEDs, monitored equipment, and/or network devices may communicate (e.g., transmit and/or receive) messages (e.g., GOOSE messages) that include bits, bit pairs, measurement values, and/or any other relevant data elements. In certain circumstances, GOOSE may allow a message generated from a single device to be transmitted to multiple receiving devices (e.g., subscriber devices and/or particular receiving devices designated or identified in a GOOSE message).

Some communications between IEDs, monitored equipment, and/or network devices may be more urgent and/or important than other communications. For example, control data or real time samples used in monitoring, controlling, automating, and/or protecting an electric power generation and delivery system or its components may be particularly valuable (e.g., time sensitive) for a certain period of time. Similarly, indications as to a data state (e.g., a measured data state) of one or more components and/or conditions within an electrical power generation and delivery system may be important to communicate relatively contemporaneous with a data state change event. To ensure that more urgent and/or important communications are received by an intended subscribing device (e.g., a receiving device), a publishing device (e.g., a publishing IED) may transmit a particular message multiple times in a message stream. Repeated transmission of the message may improve the likelihood that one or more of the redundant messages ultimately is received by a subscribing device. The increased network load associated with transmitting a particular message multiple times, however, may cause communication bottlenecks, thereby causing certain messages to be lost or delayed. For example, a receiving IED may include a finite receiving FIFO that may only store a predetermined number of messages, and thus may not be capable of storing additional messages if the number of messages received exceeds the capacity of the FIFO in a given time period. Similarly, communication and/or bandwidth bottlenecks in a wireless radio system) may cause certain messages to be lost or delayed.

Systems and methods disclosed herein may utilize a message receipt acknowledgement sent by a receiving and/or subscribing device to a transmitting and/or publishing device to manage the flow of messages (e.g., a message stream) transmitted from the transmitting and/or publishing device. In certain embodiments, a method for managing the flow of messages transmitted from a transmitting and/or publishing device may include sending a message to a receiving and/or subscribing device. The message may be part of a message stream (e.g., a multi-cast message stream) that includes multiple redundant copies of the message and/or similar messages. Messages in the message stream may include one or more control instructions, monitored system data, communications with other IEDs, monitored equipment and/or other network devices, and/or any other relevant communication, message, or data. In further embodiments, messages in the message stream may provide an indication as to a data state (e.g., a measured data state) of one or more components and/or conditions within an electrical power generation and delivery system.

When the message is received by the receiving and/or subscribing device, the receiving and/or subscribing device may transmit to the transmitting and/or publishing device a message receipt acknowledgement indicating to the transmitting and/or publishing device that the message was received. Upon receiving the message receipt acknowledgement, the transmitting and/or publishing device may terminate sending additional or similar copies of the received message included in the message stream to the receiving and/or subscribing device, thereby reducing the number of transmitted messages and communication and/or bandwidth bottlenecks.

FIG. 1 illustrates a simplified diagram of an example of an electric power generation and delivery system 100 consistent with embodiments disclosed herein. The systems and methods described herein may be applied and/or implemented in the system electric power generation and delivery system 100 illustrated in FIG. 1. The electric power generation and delivery system 100 may include, among other things, an electric generator 102, configured to generate an electrical power output, which in some embodiments may be a sinusoidal waveform. Although illustrated as a one-line diagram for purposes of simplicity, an electrical power generation and delivery system 100 may also be configured as a three-phase power system.

A step-up power transformer 104 may be configured to increase the output of the electric generator 102 to a higher voltage sinusoidal waveform. A bus 106 may distribute the higher voltage sinusoidal waveform to a transmission line 108 that in turn may connect to a bus 120. In certain embodiments, the system 100 may further include one or more breakers 112-118 that may be configured to be selectively actuated to reconfigure the electric power generation and delivery system 100. A step down power transformer 122 may be configured to transform the higher voltage sinusoidal waveform to lower voltage sinusoidal waveform that is suitable for delivery to a load 124.

The IEDs 126-138, illustrated in FIG. 1, may be configured to control, monitor, protect, and/or automate the one or more elements of the electric power generation and delivery system. An IED may be any processor-based device that monitors, controls, automates, and/or protects monitored equipment within an electric power generation and delivery system (e.g., system 100). In some embodiments, the IEDs 126-138 may gather status information from one or more pieces of monitored equipment (e.g., generator 102). Further, the IEDs 126-138 may receive information concerning monitored equipment using sensors, transducers, actuators, and the like. Although FIG. 1 illustrates one IED monitoring transmission line 108 (e.g., IED 134) and another IED controlling a breaker (e.g., IED 136), these capabilities may be combined into a single IED.

FIG. 1 illustrates IEDs 126-138 performing various functions for illustrative purposes and does not imply any specific arrangements or functions required of any particular IED. In some embodiments, IEDs 126-138 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 126-138 may be configured to communicate calculations, such as phasors (which may or may not be synchronized as synchrophasors), events, fault distances, differentials, impedances, reactances, frequency, and the like. IEDs 126-138 may also communicate settings information, IED identification information, communications information, status information, alarm information, and the like. Information of the types listed above, or more generally, information about the status of monitored equipment, may be generally referred to herein as monitored system data.

In certain embodiments, IEDs 126-138 may issue control instructions to the monitored equipment in order to control various aspects relating to the monitored equipment. For example, an IED (e.g., IED 136) may be in communication with a circuit breaker (e.g., breaker 114), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

IEDs 126-138 may be communicatively linked together using a data communications network, and may further be communicatively linked to a central monitoring system, such as a supervisory control and data acquisition (SCADA) system 142, an information system (IS) 144, and/or a wide area control and situational awareness (WCSA) system 140. In certain embodiments, various components of the electrical power generation and delivery system 100 illustrated in FIG. 1 may be configured to generate, transmit, and/or receive GOOSE messages, or communicate using any other suitable communication protocol. For example, an automation controller 150 may communicate certain control instructions to IED 126 via messages using a GOOSE communication protocol.

The illustrated embodiments are configured in a star topology having an automation controller 150 at its center, however, other topologies are also contemplated. For example, the IEDs 126-138 may be communicatively coupled directly to the SCADA system 142 and/or the WCSA system 140. The data communications network of the system 100 may utilize a variety of network technologies, and may comprise network devices such as modems, routers, firewalls, virtual private network servers, and the like. Further, in some embodiments, the IEDs 126-138 and other network devices (e.g., one or more communication switches or the like) may be communicatively coupled to the communications network through a network communications interface.

Consistent with embodiments disclosed herein, IEDs 126-138 may be communicatively coupled with various points to the electric power generation and delivery system 100. For example, IED 134 may monitor conditions on transmission line 108. IEDs 126, 132, 136, and 138 may be configured to issue control instructions to associated breakers 112-118. IED 130 may monitor conditions on a bus 152. IED 128 may monitor and issue control instructions to the electric generator 102, while IED 126 may issue control instructions to breaker 116.

In certain embodiments, communication between and/or the operation of various IEDs 126-138 and/or higher level systems (e.g., SCADA system 142 or IS 144) may be facilitated by an automation controller 150. The automation controller 150 may also be referred to as a central IED, access controller, communications processor, and/or information processor. In various embodiments, the automation controller 150 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 126-138 may communicate a variety of types of information to the automation controller 150 including, but not limited to, status and control information about the individual IEDs 126-138, IED settings information, calculations made by the individual IEDs 126-138, event (e.g., a fault) reports, communications network information, network security events, and the like. In some embodiments, the automation controller 150 may be directly connected to one or more pieces of monitored equipment (e.g., electric generator 102 or breakers 112-118).

The automation controller 150 may also include a local human machine interface (HMI) 146. In some embodiments, the local HMI 146 may be located at the same substation as automation controller 150. The local HMI 146 may be used to change settings, issue control instructions, retrieve an event report, retrieve data, and the like. The automation controller 150 may further include a programmable logic controller accessible using the local HMI 146. In certain embodiments, the automation controller 150 and/or any other system illustrated in FIG. 1 may be further communicatively coupled with one or more remote systems or IEDs including, for example, a remote SCADA system 153 and/or a remote WCSA system 154 via one or more network devices 156, 158 and/or network interfaces.

The automation controller 150 may also be communicatively coupled to a time source (e.g., a clock) 148. In certain embodiments, the automation controller 150 may generate a time signal based on the time source 148 that may be distributed to communicatively coupled IEDs 126-138. Based on the time signal, various IEDs 126-138 may be configured to collect and/or calculate time-aligned data points including, for example, synchrophasors, and to implement control instructions in a time coordinated manner. In some embodiments, the WCSA system 140 may receive and process the time-aligned data, and may coordinate time synchronized control actions at the highest level of the electrical power generation and delivery system 100. In other embodiments, the automation controller 150 may not receive a time signal, but a common time signal may be distributed to IEDs 126-138.

The time source 148 may also be used by the automation controller 150 for time stamping information and data. Time synchronization may be helpful for data organization, real-time decision-making, as well as post-event analysis. Time synchronization may further be applied to network communications. The time source 148 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a global positioning system (GPS) receiver with time decoding. In the absence of a discrete time source 148, the automation controller 150 may serve as the time source 148 by distributing a time synchronization signal.

To maintain voltage and reactive power within certain limits for safe and reliable power delivery, an electrical power generation and delivery system may include switched capacitor banks (SCBs) (e.g., capacitor 110) configured to provide capacitive reactive power support and compensation in high and/or low voltage conditions within the electrical power system. For example, when power along a transmission line included in the electrical power system meets certain predetermined criteria, the capacitors within the SCB may be switched on (e.g., via breaker 118) by an IED to maintain a proper balance of reactive power. Further, an electrical power generation and delivery system 100 may include an OLTC configured to control the quality of electric power delivered to loads associated with the electrical power system by varying transformer tap positions within the OLTC. Like the SCB, the functionality of the OLTC may be controlled using an IED.

Figure 2:
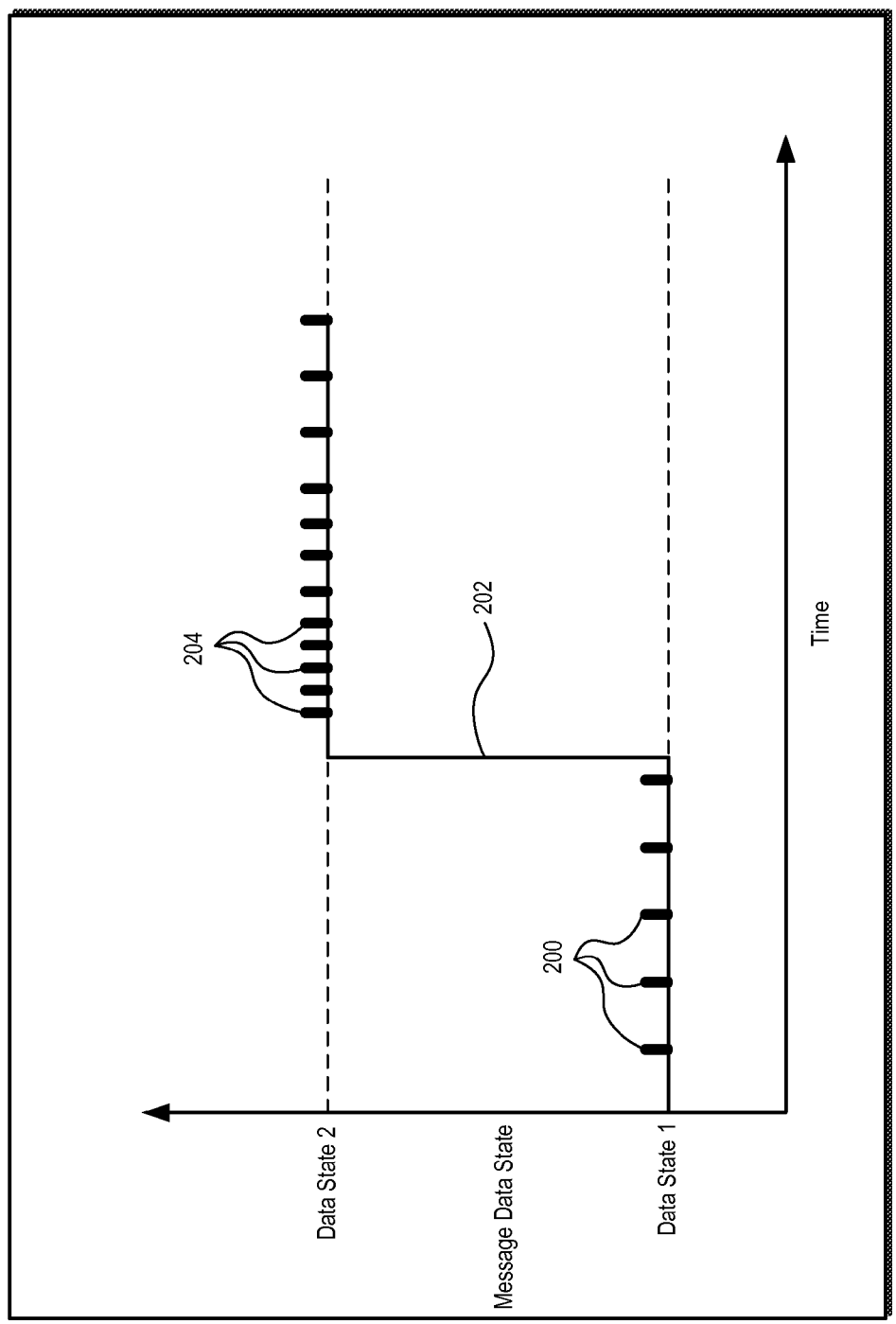
FIG. 2 illustrates an example of a timing diagram showing transmission of messages by an intelligent electronic device prior to and after a data state change consistent with embodiments disclosed herein.

FIG. 2 illustrates an example of a timing diagram showing transmission of messages 200, 204 by an IED consistent with embodiments disclosed herein. A message may include one or more control instructions, monitored system data, communications with other IEDs, monitored equipment and/or other network devices, and/or any other relevant communication, message, or data. In certain embodiments, a message may provide an indication as to a state and/or a data state (e.g., a measured state) of one or more components and/or conditions within an electrical power generation and delivery system. For example, a message may provide an indication of a measured current and/or voltage exceeding one or more thresholds. A certain state (e.g., "Data State 1") may be associated with a measurement exceeding such a threshold, while another data state (e.g., "Data State 2") may be associated with a measurement exceeding a different threshold. A message indicating a particular data state may be utilized to determine whether the measured current and/or voltage exceed the one or more thresholds. Similarly, a message may indicate a state of a component of an electric power generation and delivery system such as a state of a breaker (e.g., "open" or "closed"), a power storage device (e.g., "charged" or "depleted"), and/or the like.

In certain embodiments, messages indicating a data state may be embodied as GOOSE messages. A message may further indicate not only a particular data state, but also whether the message indicates a data state that is different than a data state indicated by one or more preceding message. That is, a message may include an indication that a data state associated with the message represents a data state change from a prior message. In certain embodiments, the prior message may be an immediately preceding message. In certain embodiments, data state change information may be indicated by a data state change indicator (DSCI) included in the message. For example, a DSCI included in a message may be set to "1" following a first data state change event. Accordingly to some embodiments, the DSCI may be asserted in only a first message following a data state change event. In other embodiments, the SCIB may be asserted for a specified period of time or for a specified number of messages (e.g., a message stream). The SCIB may be set to a different value upon a subsequent data state change event. By utilizing a DSCI, a receiving device may determine that a particular message indicates a recent data state change without having to examine certain contents of the message and/or previously received messages.

In certain embodiments, an IED may transmit to subscribing (e.g., receiving) devices and/or receive from publishing (e.g., transmitting) devices messages 200 reflecting a particular data state (e.g., "Data State 1") at periodic intervals at a first communication rate after a certain period in which the data state has remained constant (e.g., a message stream). For example, if a measured data state has not changed within the last 30 seconds, an IED may transmit messages 200 at periodic intervals at the first communication rate. In certain embodiments, this periodic interval may be relatively long, reflecting that a data state change has not recently occurred. Transmitting the same or similar data state messages periodically in a message stream may introduce a degree of redundancy, helping to ensure that subscribing devices receive messages during periods of network congestion and/or low network bandwidth conditions. Further, the continuous transmission may serve as an indicator that the transmitting device is continuing to operate as expected. Accordingly, the continuous stream of messages may be referred to as a "heartbeat".

When a data state change occurs (e.g., at 202), the IED may publish and/or receive messages 204 reflecting the changed data state (e.g., "Data State 2") at periodic intervals having a second communication rate. As illustrated, in certain embodiments, the second communication rate may be faster than the first communication rate. Accordingly, the period between sequential messages 204 may be shorter than the period between sequential messages 200. As time progresses following the data state change event 202, the communication rate of the messages 204 may progressively slow to reach, for example, a rate at or near the first communication rate. In this manner, data state messages may be transmitted at a relatively fast rate immediately following a data state change event 202 that progressively slows as the data state change event 202 becomes older. According to some embodiments, the transmission rate may decrease exponentially for a period of time following the data state change event 202.

Transmitting measured data state messages at a faster rate after a data state change event 202 may ensure that devices subscribing to the communications (e.g., subscribing IEDs) are more likely to receive the messages indicating the data state change as closely as possible in time to the actual data state change event 202. Transmitting redundant messages at a relatively fast rate, however, may introduce network congestion and/or bandwidth issues in some devices (e.g., communication switches, routers, radios, multiplexors, a real-time automation controller, IEDs, PLCs, and/or the like). Consistent with embodiments disclosed herein, a message buffer may be utilized in such devices to ensure that data state change messages are properly transmitted and/or routed under congested network or low network bandwidth conditions.

Figure 3B:
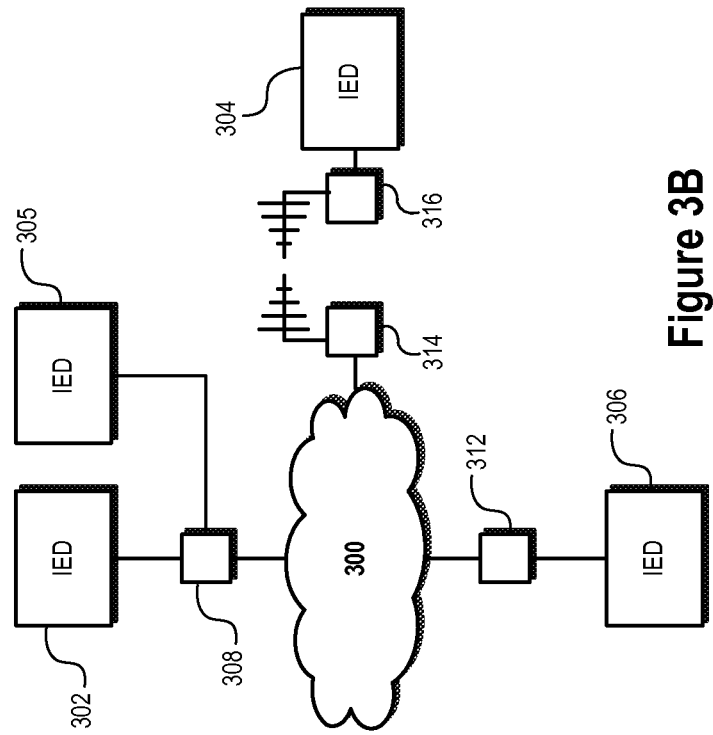
FIG. 3B illustrates intelligent electronic devices communicatively coupled with a network via network devices and network radios consistent with embodiments disclosed herein.
Figure 3A:
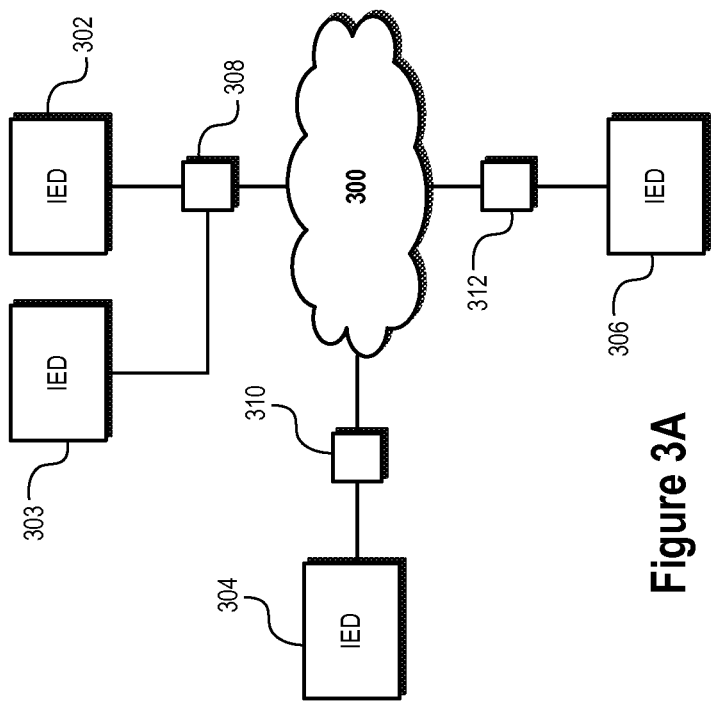
FIG. 3A illustrates intelligent electronic devices communicatively coupled with a network via network devices consistent with embodiments disclosed herein.

FIG. 3A illustrates IEDs 302-306, 303 communicatively coupled with a network 300 via network switches 308-312 consistent with embodiments disclosed herein. Although embodiments illustrated in FIG. 3A are discussed in reference to IEDs 302-306, 303 and network switches 308-312, further embodiments may be implemented in other suitable IEDs and/or network devices. As discussed above, IEDs 302-306, 303 may be configured to communicate via a network 300 using messages (e.g., GOOSE messages) that, in certain embodiments, may provide an indication as to a data state of one or more components and/or conditions within an electrical power generation and delivery system.

The network switches 308-312 may be configured to receive messages from the network 300 and to transmit certain messages to an associated IED 302-306, 303. For example, network switch 308 may be configured to receive messages from the network 300 and to transmit certain of the received messages to IED 302 and/or IED 303. As discussed above, in certain circumstances, a receiving IED (e.g., IED 302 and/or 303) may include a finite receiving FIFO that may only store a predetermined number of messages, and thus may not be capable of storing certain messages if a significant number of messages are received in a relatively short period (e.g., during periods of high network message traffic). Similarly, a network switch (e.g., network switch 308) may have a limited transfer rate that is lower than its receiving rate. For example, a network switch may have a 1 MB/second data transmission rate but a receiving rate that is substantially greater, thereby creating an asymmetry between inbound and outbound communication rates. If such a network switch includes a finite receiving and/or transmitting buffer and a substantial amount of data (e.g., a message stream) is received by such a network switch in a short period of time, the network switch may be unable to transmit received messages before the finite buffers become full and thus messages may be dropped or lost. In further circumstances, network devices and/or IEDs may have insufficient computing resources to process network traffic at "wire speed."

Consistent with certain embodiments, IEDs 302-306, 303 and/or network switches 308-312 may utilize a message receipt acknowledgement sent by a receiving and/or subscribing device to a transmitting and/or publishing device to manage the flow of messages (e.g., a message stream) transmitted from the transmitting and/or publishing device. As discussed below in more detail in reference to FIGS. 4A-4D, by managing the flow of messages in accordance with the disclosed embodiments, the occurrence of dropped or lost messages and/or communication bottlenecks may be reduced.

FIG. 3B illustrates IEDs 302-306, 305 communicatively coupled with a network 300 via network devices 308, 312 and network radios 314, 316 consistent with embodiments disclosed herein. Certain elements of the system illustrated in FIG. 3B may be similar to those illustrated in and described in reference to FIG. 3A and, accordingly, similar elements may be denoted with like numerals. As with FIG. 3A, although certain illustrated embodiments are discussed in reference to IEDs 302-306, 305 network switches 308, 312 and network radios 314, 316, further embodiments may be implemented in other suitable IEDs and/or network devices.

IEDs 302-306, 305 may be configured to communicate via a network 300 using messages (e.g., GOOSE messages) that, in certain embodiments, may provide an indication as to a data state and/or data state change of one or more components and/or conditions within an electrical power generation and delivery system. The network switches 308, 312 and/or and network radios 314, 316 may be configured to receive messages from the network 300 and to transmit certain messages to an associated IED 302-306, 305. For example, network switch 308 may be configured to receive messages from the network 300 and to transmit certain of the received messages to IED 302 and/or IED 305. Similarly, IED 304, may communicate (e.g., exchange messages) with the network 300 via one or more network radios 314, 316 or other similar network devices implementing a wireless communication methodology.

In certain circumstances, a subscribing IED (e.g., IED 304) may include a finite receiving FIFO that may only store a predetermined number of messages, and thus may not be capable of storing certain messages if a significant number of messages are received in a relatively short period (e.g., during periods of high network message traffic). Similarly, a network radio (e.g., network radio 314) may have a limited transfer rate but a less restrictive receiving rate. For example, network radio 314 may have a 1 MB/second data transfer rate but a receiving rate that is substantially greater. Similarly, a wireless communication channel between network radio 314 and network radio 316 may have limited bandwidth. Messages may be lost due to these and other types of communication bottlenecks.

Consistent with certain embodiments, to mitigate issues attributed to network bottlenecking, network switches 308, 312 and/or and network radios 314, 316 may may utilize a message receipt acknowledgement sent by a receiving and/or subscribing device to a transmitting and/or publishing device to manage the flow of messages (e.g., a message stream) transmitted from the transmitting and/or publishing device. As discussed below in more detail in reference to FIGS. 4A-4D, by managing the flow of messages in accordance with the disclosed embodiments, the occurrence of dropped or lost messages and/or communication bottlenecks may be reduced.

Figure 4A:
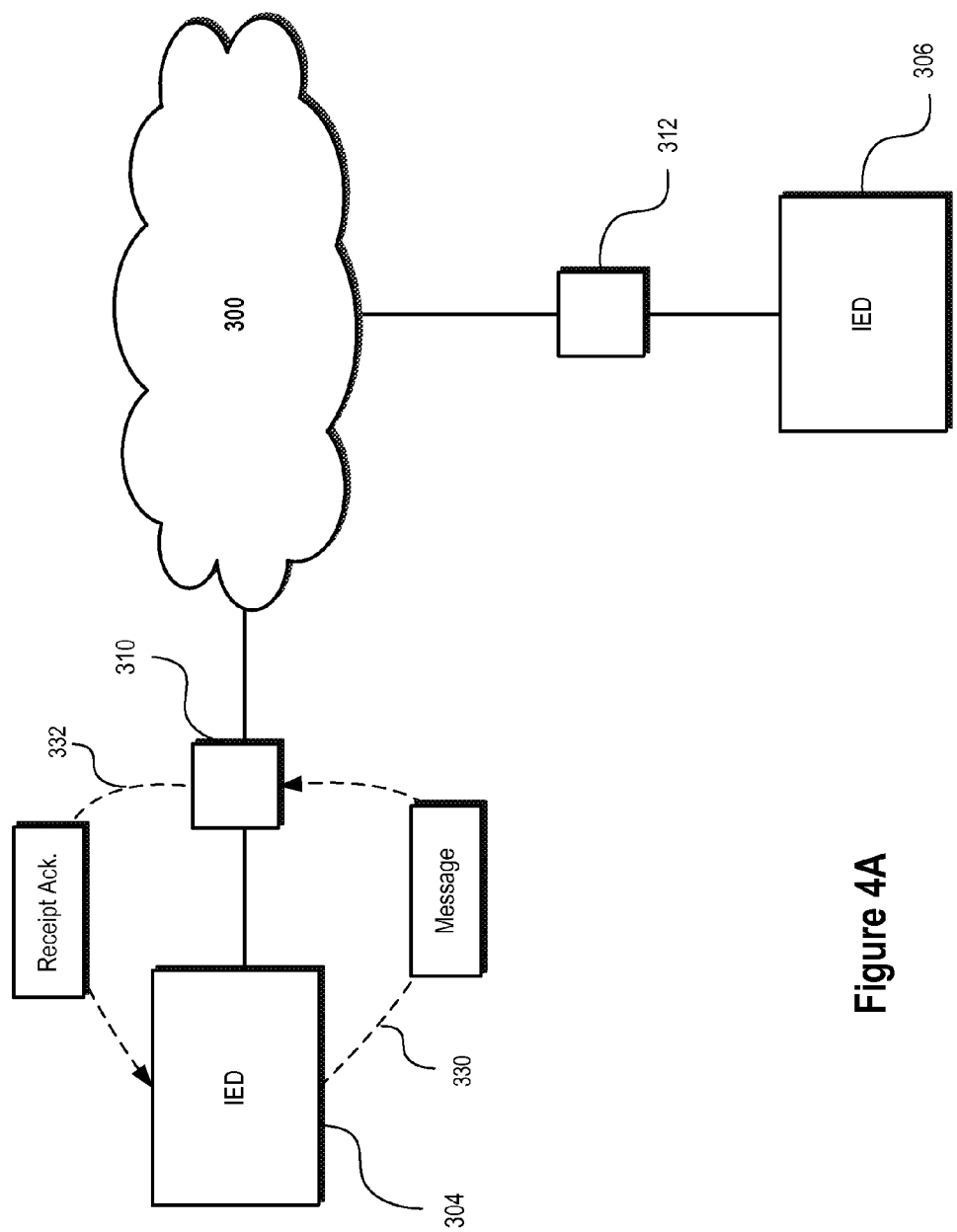
FIG. 4A illustrates communication between an intelligent electronic device and network devices consistent with embodiments disclosed herein.

FIG. 4A illustrates communication between an IED 304 and network switch 310 consistent with embodiments disclosed herein. Certain elements of the system illustrated in FIG. 4B may be similar to those illustrated in and described in reference to FIG. 3A and FIG. 3B and, accordingly, similar elements may be denoted with like numerals. Further, although certain illustrated embodiments are discussed in reference to IED 304 and network switch 310, further embodiments may be implemented in other suitable IEDs and/or network devices.

IED 304 may be communicatively coupled to a network 300 via a network switch 310. IED 304 may be configured to communicate with the network 300 and/or network switch 310 using messages (e.g., GOOSE messages). In certain embodiments, the messages may provide an indication as to a data state and/or data state change of one or more components and/or conditions within an electrical power generation and delivery system. As discussed above, to ensure that communications are received by an intended subscribing device (e.g., a receiving device), a publishing device (e.g., a publishing IED) may transmit a particular message or similar copies of the message multiple times in a message stream.

As illustrated by arrow 330, IED 304 may transmit a message to network switch 310. The message may be part of a message stream that includes multiple copies of the same and/or similar message. Transmitting the same or similar messages (e.g., data state messages) periodically in a message stream may introduce a degree of redundancy, helping to ensure that subscribing devices receive messages during periods of network congestion and/or low network bandwidth conditions. The increased network load associated with transmitting a particular message multiple times, however, may cause communication bottlenecks, thereby causing certain messages to be lost or delayed.

To better manage the flow of messages and reduce lost or delayed messages and/or communication bottlenecks, a receiving and/or subscribing device may transmit a message receipt acknowledgement to a transmitting and/or publishing device indicating that a message (e.g., a particular message) was received. For example, as illustrated by arrow 332, after receiving a message from IED 304, network switch 310 may transmit a message receipt acknowledgement to IED 304 indicating receipt of the message. Upon receipt of this receipt acknowledgement indication, the IED 304 may stop transmitting further redundant copies of the message, thereby reducing the number of messages transmitted from IED 304 to the network switch 310. In this manner, the flow of messages between IED 304 and network switch 310 may be better managed (e.g., during periods of high network message traffic), and the occurrence of lost or delayed messages and/or communication bottlenecks may be reduced.

Figure 4B:
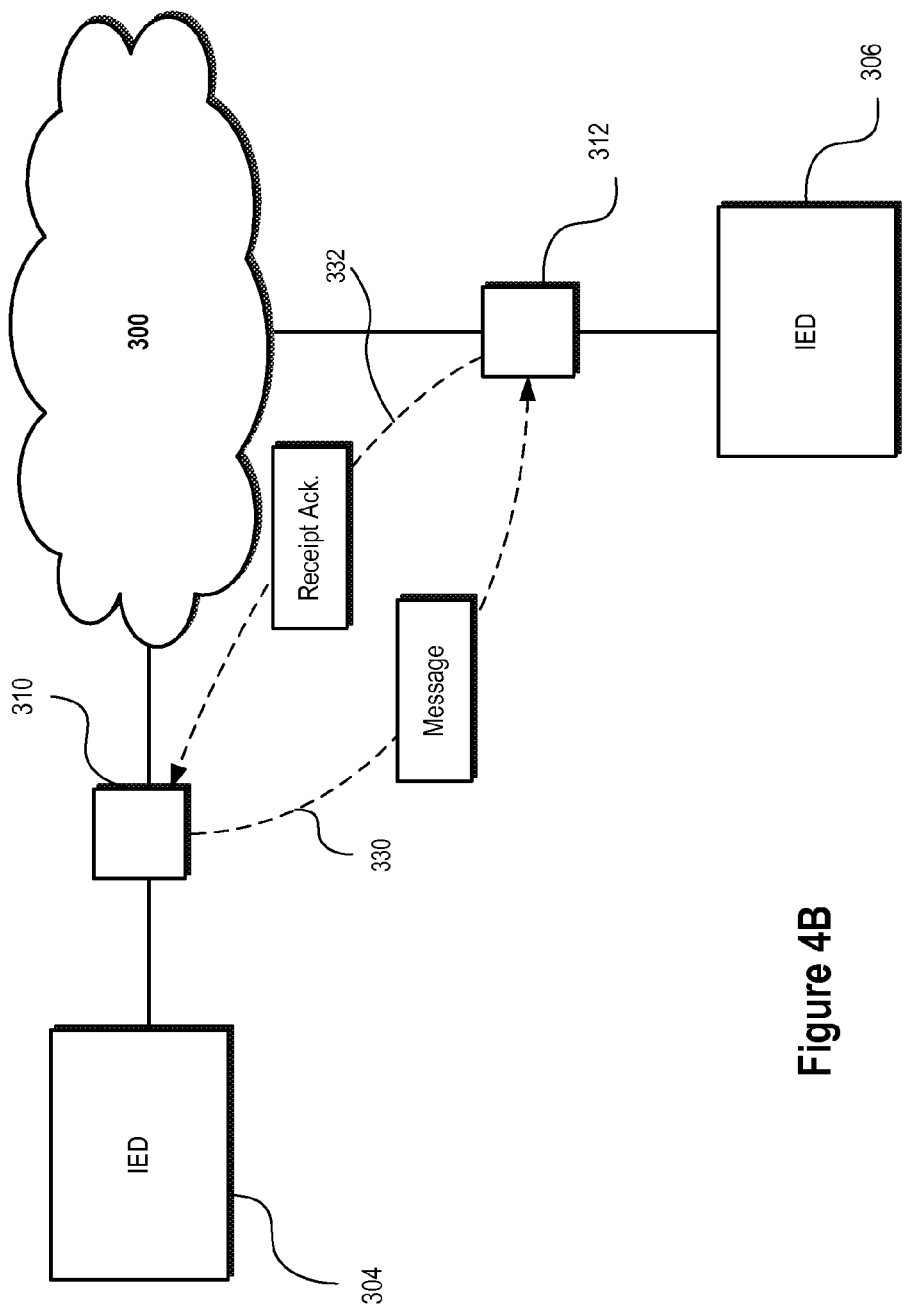
FIG. 4B illustrates communication between network devices consistent with embodiments disclosed herein.

FIG. 4B illustrates communication between network switch 312 and an IED 306 consistent with embodiments disclosed herein. Certain elements of the system illustrated in FIG. 4B may be similar to those illustrated in and described in reference to FIGS. 3A-4A and, accordingly, similar elements may be denoted with like numerals. Further, although certain illustrated embodiments are discussed in reference to network switches 310, 312, further embodiments may be implemented in other suitable IEDs and/or network devices.

Network switch 310 may be communicatively coupled to a network switch 312 via network 300. Network switch 310 may be configured to communicate with the network 300 and/or network switch 312 using messages (e.g., GOOSE messages). In certain embodiments, the messages may provide an indication as to a data state and/or data state change of one or more components and/or conditions within an electrical power generation and delivery system. As discussed above, to ensure that communications are received by an intended subscribing device (e.g., a receiving device), a publishing device (e.g., a publishing IED) may transmit a particular message or similar copies of the message multiple times in a message stream. For example, network switch 310 may receive a message stream from IED 304 and may route messages of the message stream to network switch 312 via the network 300.

IED 304 may transmit a message to network switch 310 that, as illustrated by arrow 330, may be routed to network switch 312 via network 300. The message may be part of a message stream that includes multiple copies of the same and/or similar message. To better manage the flow of messages and reduce the occurrence of lost or delayed messages and/or communication bottlenecks, a receiving and/or subscribing device may transmit a message receipt acknowledgement as illustrated by arrow 332 to a transmitting and/or publishing device indicating that a message (e.g., a particular message) was received. For example, as illustrated, after receiving a message from network switch 310, network switch 312 may transmit a message receipt acknowledgement to network switch 310 indicating receipt of the message. Upon receipt of this receipt acknowledgement indication, network switch 310 may stop transmitting further redundant copies of the message, thereby reducing the number of messages transmitted from network switch 310 to network switch 312. In this manner, the flow of messages between network switches 310, 312 may be better managed (e.g., during periods of high network message traffic), and the occurrence of lost or delayed messages and/or communication bottlenecks may be reduced.

Figure 4C:
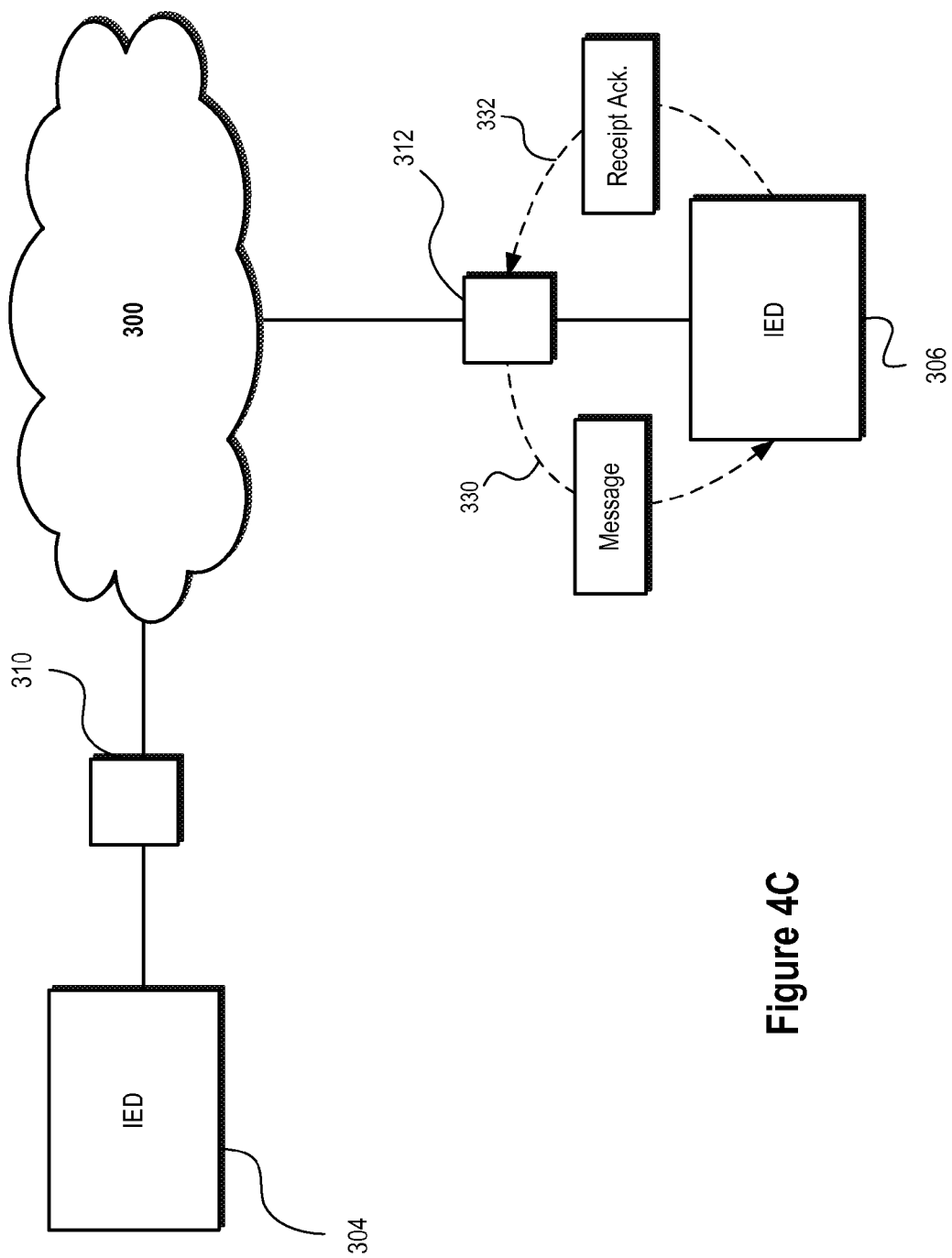
FIG. 4C illustrates communication between network devices and an intelligent electronic device consistent with embodiments disclosed herein.

FIG. 4C illustrates communication network switch 312 and IED 306 consistent with embodiments disclosed herein. Certain elements of the system illustrated in FIG. 4C may be similar to those illustrated in and described in reference to FIGS. 3A-4B and, accordingly, similar elements may be denoted with like numerals. Further, although certain illustrated embodiments are discussed in reference to network switch 312 and IED 306, further embodiments may be implemented in other suitable IEDs and/or network devices.

IED 306 may be communicatively coupled to a network 300 via network switch 312. IED 306 may be configured to communicate with the network 300 and/or network switch 312 using messages (e.g., GOOSE messages). In certain embodiments, the messages may provide an indication as to a data state and/or data state change of one or more components and/or conditions within an electrical power generation and delivery system. As discussed above, to ensure that communications are received by an intended subscribing device (e.g., a receiving device), a publishing device (e.g., a publishing IED) may transmit a particular message or similar copies of the message multiple times in a message stream. For example, network switch 312 may receive a message stream originating from IED 304 via network 300, and may route the message stream to IED 306.

IED 304 may transmit a message to network switch 312 via network 300. Network switch 312 may be configured to route the message to IED 306 (e.g., as a subscribing device), as illustrated by arrow 330. The message may be part of a message stream that includes multiple copies of the same and/or similar message. To better manage the flow of messages and reduce lost or delayed messages and/or communication bottlenecks, a receiving and/or subscribing device may transmit a message receipt acknowledgement to a transmitting and/or publishing device indicating that a message (e.g., a particular message) was received. For example, as illustrated by arrow 332, after receiving a message from network switch 312, IED 306 may transmit a message receipt acknowledgement to network switch 312 indicating receipt of the message. Upon receipt of this receipt acknowledgement indication, network switch 312 may stop transmitting further redundant copies of the message, thereby reducing the number of messages transmitted from network switch 312 to IED 306. In this manner, the flow of messages between network switch 312 and IED 306 may be better managed (e.g., during periods of high network message traffic), and lost or delayed messages and/or communication bottlenecks may be reduced.

Figure 4D:
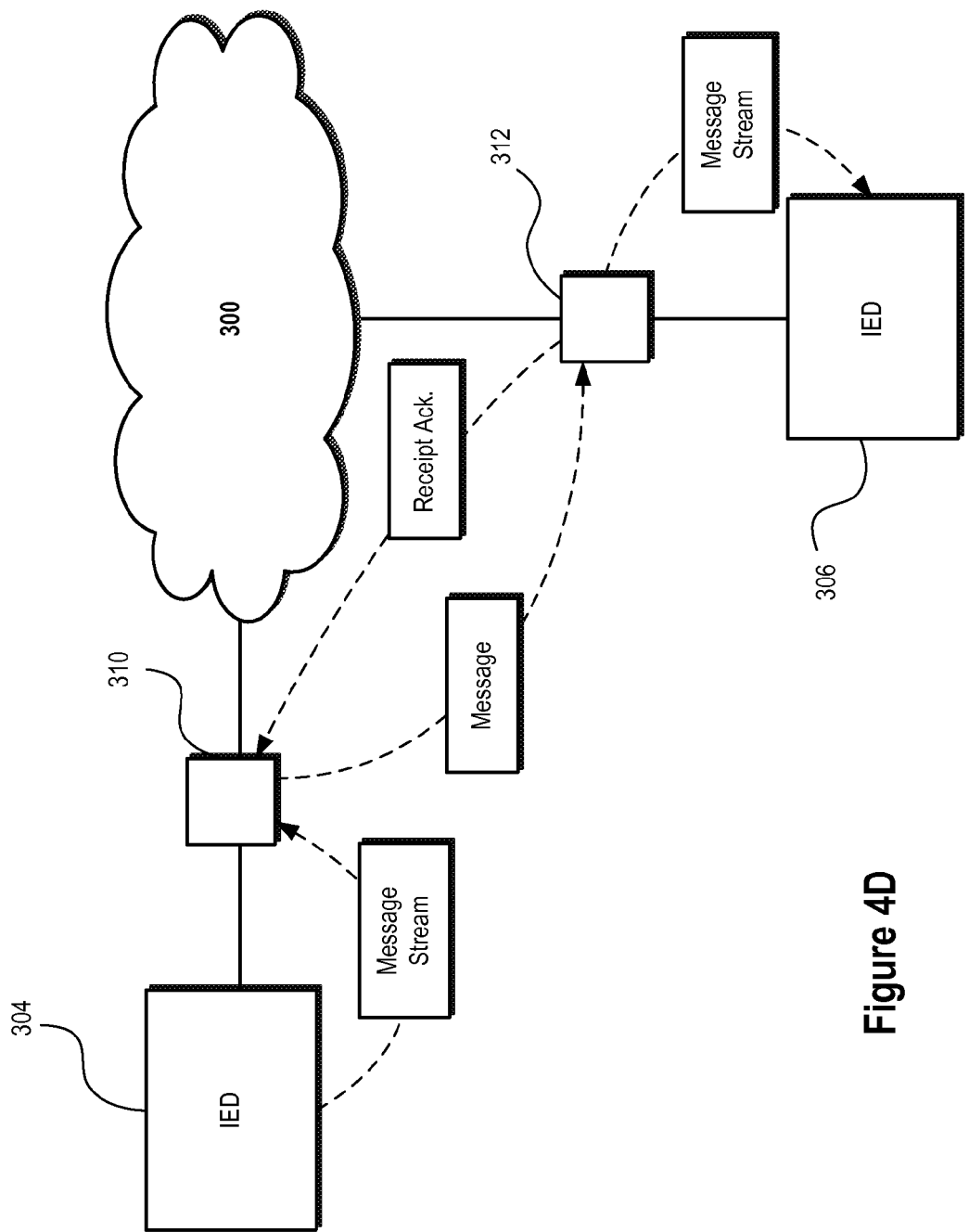
FIG. 4D illustrates communication between intelligent electronic devices and network devices via a network consistent with embodiments disclosed herein.

FIG. 4D illustrates communication between IEDs 304, 306 and network devices (e.g., network switches 310, 312) via a network 300 consistent with embodiments disclosed herein. Certain elements of the system illustrated in FIG. 4D may be similar to those illustrated in and described in reference to FIGS. 3A-4C and, accordingly, similar elements may be denoted with like numerals. Further, although certain illustrated embodiments are discussed in reference to IEDs 304, 306 and network switches 310, 312, further embodiments may be implemented in other suitable IEDs and/or network devices.

IED 304 may be communicatively coupled to the network 300 via network switch 310. Similarly, IED 306 may be communicatively coupled to the network 300 via network switch 312. IEDs 304, 306 and network switches 310, 312 may be configured to communicate (e.g., via the network 300) using messages (e.g., GOOSE messages). In certain embodiments, the messages may provide an indication as to a data state and/or data state change of one or more components and/or conditions within an electrical power generation and delivery system. As discussed above, to ensure that communications are received by an intended receiving or subscribing device, a transmitting or publishing device may transmit a particular message or similar copies of the message multiple times in a message stream.

As illustrated, IED 304 may transmit a message stream to network switch 310. The message stream may include redundant copies of a particular message (e.g., a message including particular data state information). In certain embodiments, IED 304 and network switch 310 may be capable of communicating without loss or delay of messages included in the message stream. For example, the IED 304 and network switch 310 may be capable communicating and/or processing message traffic at relatively high speeds and/or line rates, and thus may be able to transmit/receive and/or process all messages included in the message stream without loss or delay.

Network switch 310 may be configured to transmit the message stream to IED 306 via network 300 and network switch 312. Accordingly, as illustrated, network switch 310 may be configured to communicate with network switch 312 via network 300. Reduced bandwidth in a network path between network switch 310 and network switch 312, device hardware limitations in network switches 310, 312 and/or network 300, and/or any other similar circumstance may cause a communication bottleneck between network switch 310 and network 312 during high network traffic conditions, potentially resulting in the loss or delay of messages included in a message stream. To ensure that messages are not lost or delayed between network switch 310 and network switch 312, the network switches 310, 312 may utilize a message receipt acknowledgement methodology consistent with embodiments disclosed herein.

As illustrated, network switch 310 may transmit a message to network switch 312 that, in certain embodiments, may be part of a message stream that includes multiple copies of the same and/or similar message. (e.g., the message stream transmitted by IED 304 to network switch 310). To better manage the flow of messages and reduce the occurrence of lost or delayed messages and/or communication bottlenecks, receiving network switch 312 may transmit a message receipt acknowledgement to transmitting network switch 310 indicating that a message (e.g., a particular message of the message stream) was received. For example, as illustrated, after receiving a message from network switch 310, network switch 312 may transmit a message receipt acknowledgement to network switch 310 indicating receipt of the message. Upon receipt of this receipt acknowledgement indication, network switch 312 may stop transmitting further redundant copies of the message, thereby reducing the number of messages transmitted from network switch 310 to network switch 312. In this manner, the flow of messages between network switch 310 and network switch 312 may be better managed (e.g., during periods of high network message traffic), and lost or delayed messages caused by communication bottlenecks may be reduced.

Network switch 312 may transmit the message to IED 306 (e.g., a subscribing device) as part of a message stream that includes multiple redundant copies of the message. In certain embodiments, network switch 312 and IED 306 may be capable of communicating and/or processing message traffic at relatively high speeds and/or line rates, and thus may be able to transmit/receive and/or process all messages included in the message stream without loss or delay. Accordingly, network switch 312 and IED 306 may not need to implement the message receipt acknowledgement methodology disclosed herein to mitigate issues caused by communication bottlenecks during high network traffic.

As illustrated in and described in reference to FIG. 4D, embodiments of the disclosed message receipt acknowledgement methodology may be implemented in certain network and/or communication pathways that may experience communication bottlenecks (e.g., communications between network switches 310, 312), and may not be implemented between other network and/or communication pathways that do not experience communication bottlenecks (e.g., communications between IED 304 and network switch 310 and network switch 312 and IED 306). Selectively implementing the disclosed systems and methods where beneficial in an electric power generation and delivery system may allow for issues caused by local, regional, and/or isolated communication bottlenecks within a system topology to be reduced with minimal modifications to the components of the electric power generation and delivery system.

In certain embodiments, embodiments of the disclosed message receipt acknowledgement systems and methods may allow for the generation of network information and/or data relating to communications in an electric power generation and delivery system. For example, latency of a particular network and/or communication pathway may be calculated based on a time between transmitting a message and receiving a message receipt acknowledgement. In certain embodiments, processing time at the receiving device may be accounted for in such a calculation to provide more accurate network and/or communication pathway latency information.

Figure 5:
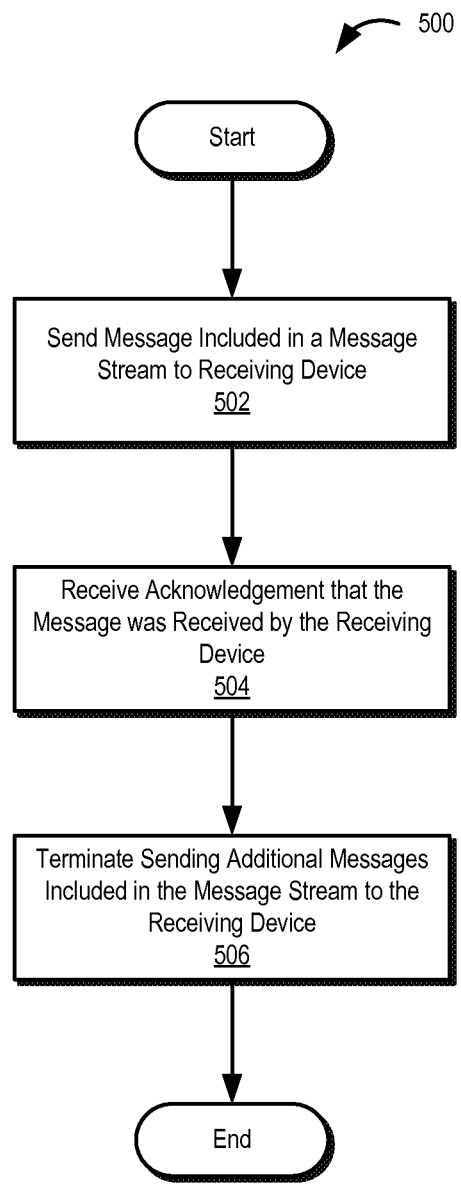
FIG. 5 illustrates a flow chart of a method for exchanging messages between devices in an electric power generation and delivery system consistent with embodiments disclosed herein.

FIG. 5 illustrates a flow chart of a method 500 for exchanging messages between devices in an electric power generation and delivery system consistent with embodiments disclosed herein. Particularly, the illustrated method 500 may be performed by a network devices and/or IEDs that, in certain embodiments, may incorporate features of the systems illustrated in FIGS. 3A-4D. At 502, a message including an identifier may be sent to a receiving device (e.g., a subscribing device) by a transmitting device that, in certain embodiments, may be a publishing device associated with the identifier. The message may be a GOOSE message and the identifier may be a subscription identifier. The message may further be a message of a message stream that includes multiple redundant copies of the same and/or similar message.

At 504, a the transmitting device may receive a message receipt acknowledgement indicating that the transmitted message was received by the receiving device. In response to receiving the message receipt acknowledgement, at 506, the transmitting device may terminate sending further redundant copies of the transmitted message, thereby reducing the number of messages transmitted from the transmitting device to the receiving device. In this manner, the flow of messages between the transmitting device and the receiving device may be better managed (e.g., during periods of high network message traffic), and lost or delayed messages caused by communication bottlenecks may be reduced.

Figure 6:
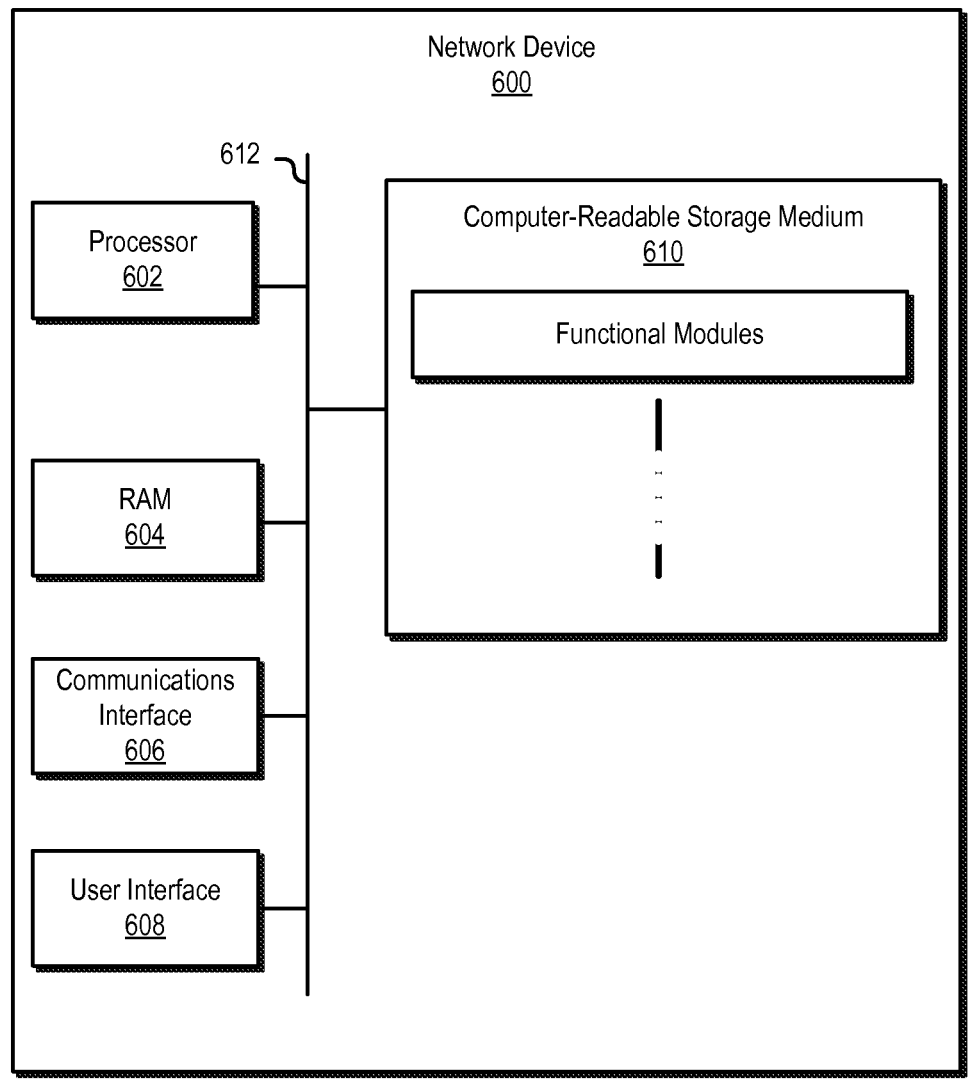
FIG. 6 illustrates a block diagram of a network device for implementing certain embodiments of the systems and methods disclosed herein.

FIG. 6 illustrates a block diagram of a network device 600 for implementing certain embodiments of the systems and methods disclosed herein. In certain embodiments, the network device 600 may be a network switch, modem, router, firewall, virtual private network server, and/or and any other suitable network device or system. Further embodiments may be implemented in an IED. As illustrated, the computer system 600 may include a processor 602, a random access memory (RAM) 604, a communications interface 606, a user interface 608, and/or a non-transitory computer-readable storage medium 610. The processor 602, RAM 604, communications interface 606, user interface 608, and computer-readable storage medium 610 may be communicatively coupled to each other via a common data bus 612. In some embodiments, the various components of the network device 600 may be implemented using hardware, software, firmware, and/or any combination thereof.

The user interface 608 may be used to control certain features of the network device 600 (e.g., via any suitable interactive interface to a user, one or more visual or audible status indicators, and/or the like). The user interface 608 may be integrated in the network device 600 or, alternatively, may be a user interface for a laptop or other similar device communicatively coupled with the computer system 600. In certain embodiments, the user interface 608 may be produced on a touch screen display. The communications interface 606 may be any interface capable of communicating with other computer systems and/or other equipment (e.g., remote network equipment) communicatively coupled to computer system 600.

The processor 602 may include one or more general purpose processors, application specific processors, microcontrollers, digital signal processors, FPGAs, or any other customizable or programmable processing device. The processor 602 may be configured to execute computer-readable instructions stored on the non-transitory computer-readable storage medium 610. In some embodiments, the computer-readable instructions may be computer-executable functional modules. For example, the computer-readable instructions may include one or more functional modules configured to implement all or part of the functionality of the systems and methods described above in reference to FIGS. 1-5.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. A method for managing the exchange of messages between a first device and a second device, the method comprising:
    transmitting at a first rate, from a first communications interface of the first device to a second communications interface of the second device, messages included in a first message stream, the first message stream comprising a plurality of first redundant messages;
    receiving, at the first communications interface from the second communications interface, a first indication that at least one message of the first message stream was received by the second device;
    terminating, in response to receiving the first indication, transmission of further first redundant messages included in the first message stream to the second device; and
    transmitting at a second rate different than the first rate, in response to receiving the first indication, from the first communications interface of the first device to the second communications interface of the second device, a second message stream comprising a plurality of second redundant messages.

2. The method of claim 1, wherein the first redundant messages and the second redundant messages comprise IEC 61850 Generic Object Oriented Substation Events (GOOSE) messages.

3. The method of claim 1, wherein the first redundant messages and the second redundant messages each comprise a subscription identifier.

4. The method of claim 1, wherein the first redundant messages and the second redundant messages each comprise data state information.

5. The method of claim 1, wherein the first redundant messages comprise identical redundant copies.

6. The method of claim 1, wherein the first redundant messages each comprise at least one identical portion.

7. The method of claim 1 further comprising:
    generating network information based in part on a time between transmitting the first redundant messages and receiving the first indication.

8. A non-transitory computer-readable storage medium storing instructions that, when executed by a processor of a first device, cause the processor to:
    transmit at a first rate, from a first communications interface of the first device to a second communications interface of the second device, messages included in a first message stream, the first message stream comprising a plurality of first redundant messages;
    receive, at the first communications interface from the second communications interface, a first indication that at least one message of the first message stream was received by the second device;
    terminate, in response to receiving the first indication, transmission of further first redundant messages included in the first message stream to the second device; and
    transmitting at a second rate different than the first rate, in response to receiving the first indication, from the first communications interface of the first device to the second communications interface of the second device, a second message stream comprising a plurality of second redundant messages.

9. The non-transitory computer-readable storage medium of claim 8, wherein the first redundant messages and the second redundant messages comprise GOOSE messages.

10. The non-transitory computer-readable storage medium of claim 8, wherein the first redundant messages and the second redundant messages each comprise a subscription identifier.

11. The non-transitory computer-readable storage medium of claim 8, wherein the first redundant messages and the second redundant messages message comprises data state information.

12. The non-transitory computer-readable storage medium of claim 8, wherein the first redundant messages comprise identical redundant copies.

13. The non-transitory computer-readable storage medium of claim 8, wherein the first redundant messages each comprise at least one identical portion.

14. The non-transitory computer-readable storage medium of claim 8, wherein the instructions further cause the processor to:
    generate network information based in part on a time between transmitting the first redundant messages and receiving the first indication.

15. A method for managing the exchange of messages between a first device and a second device, the method comprising:
    transmitting at a first message rate, a message stream of redundant messages from a first communications interface of a first device to a second communications interface of a second device;

upon detection of a state change, transmitting, from the first communications interface of the first device to the second communications interface of the second device, messages indicating the state change included in the message stream, the message stream comprising a plurality of further redundant messages at a second message rate;

receiving, at the first communications interface from the second communications interface, a first indication that at least one message of the message stream indicating the state change was received by the second device;

terminating, in response to receiving the first indication, transmission of further redundant copies of the message included in the message stream to the second device; and transmitting the redundant messages of the message stream at the first message rate in response to the receiving the first indication and following the termination of the transmission of the further redundant messages at the second message rate.

* * * * *